United States Patent [19]

Yamamoto et al.

[11] Patent Number: 5,201,094
[45] Date of Patent: Apr. 13, 1993

[54] WIPER APPARATUS WITH ADJUSTABLE LIMIT POSITIONS

[75] Inventors: Tokihiko Yamamoto, Kariya; Ryoichi Fukumoto, Nagoya; Kazuhiro Sumiya, Hekinan; Masao Ohhashi, Kariya, all of Japan

[73] Assignee: Aisin Seiki Kabushiki Kaisha, Kariya City, Japan

[21] Appl. No.: 677,183

[22] Filed: Mar. 29, 1991

[30] Foreign Application Priority Data

Mar. 30, 1990 [JP] Japan ................................. 2-85265

[51] Int. Cl.$^5$ .............................. B60S 1/06; B60S 1/18
[52] U.S. Cl. .............................. 15/250.13; 15/250.16; 74/522; 74/42; 74/600; 74/836
[58] Field of Search .......... 15/250.13, 250.16, 250.17, 15/250.23, 250.39, 250.18, 250.19; 74/42, 43, 51, 600, 602, 828, 522, 571 M, 836, 70, 75

[56] References Cited

U.S. PATENT DOCUMENTS

| | | | |
|---|---|---|---|
| 2,855,784 | 10/1958 | Dyer | 15/250.17 |
| 2,880,621 | 4/1959 | Dyer et al. | 15/250.13 |
| 4,787,114 | 11/1988 | Okudaira | 15/250.13 |
| 4,798,102 | 1/1989 | Buschur et al. | 15/250.16 |
| 4,934,014 | 6/1990 | Yamamoto | 15/250.13 |
| 4,947,507 | 8/1990 | Noiki | 15/250.16 |
| 5,031,265 | 7/1991 | Nakatsukasa et al. | 15/250.13 |

FOREIGN PATENT DOCUMENTS

| | | | |
|---|---|---|---|
| 63-82860 | 4/1988 | Japan . | |
| 0132446 | 5/1989 | Japan | 15/250.13 |
| 493243 | 10/1938 | United Kingdom | 15/250.16 |

Primary Examiner—Harvey C. Hornsby
Assistant Examiner—Gary K. Graham
Attorney, Agent, or Firm—Finnegan, Henderson, Farabow, Garrett and Dunner

[57] ABSTRACT

A wiper apparatus for a vehicle windshield having a linkage pivotably attached to a main driving lever. Linkage is also coupled to a motor to rotate main lever for rotating a main shaft limit positions for selecting resting place of wiper blade. An eccentric cam is rotatably mounted to the main shaft with an intermediate member rotatable relative to the cam and attached to the linkage. A driving mechanism rotates the cam to adjust the position of the linkage relative to the driving lever which in turn determines the upper and lower position of wiper blade.

7 Claims, 5 Drawing Sheets

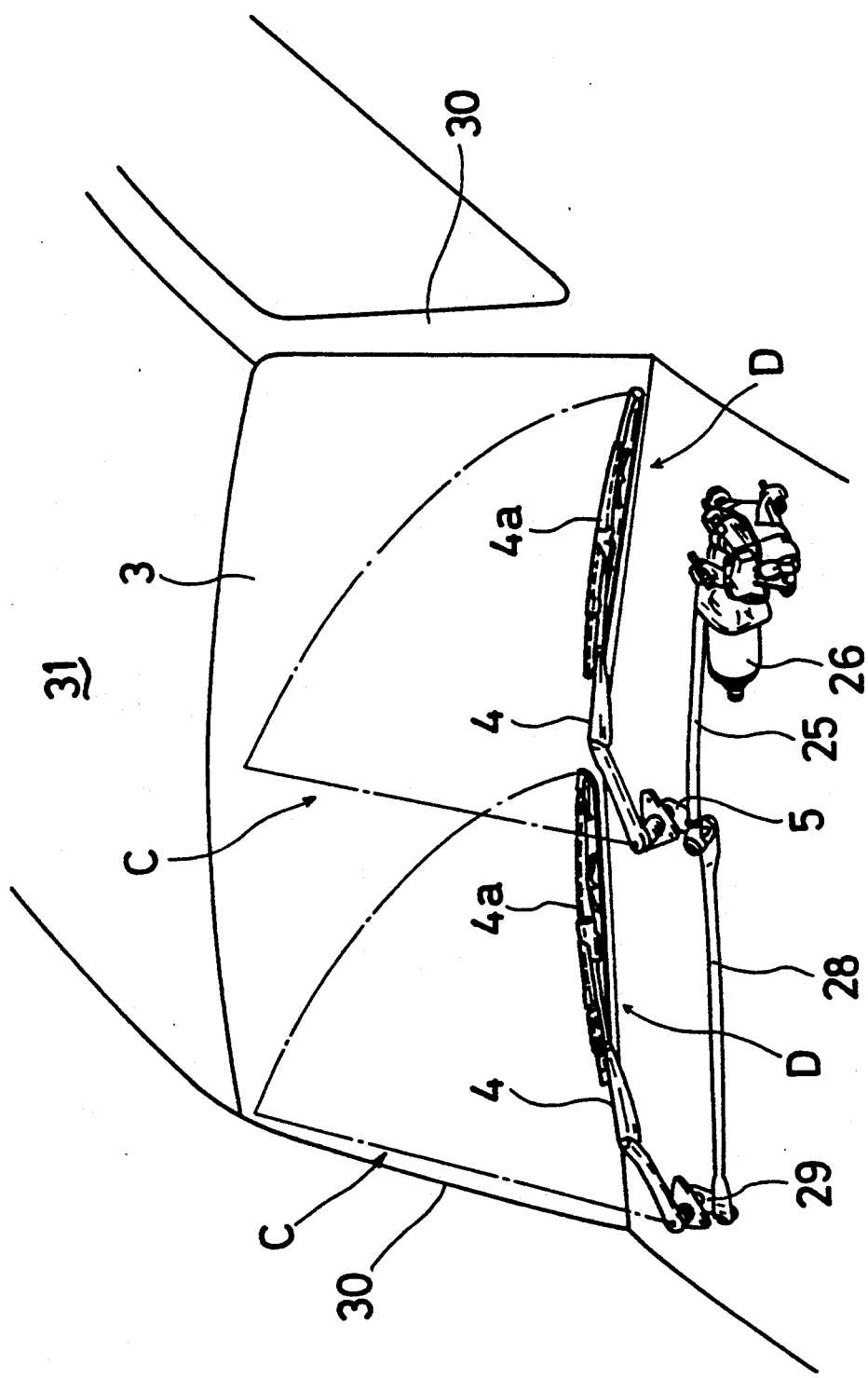

WIPER APPARATUS WITH ADJUSTABLE LIMIT POSITIONS

BACKGROUND OF THE INVENTION

The present invention relates to a wiper apparatus for wiping an area of a windshield of a vehicle.

In general, a typical conventional wiper apparatus is disclosed in Japanese Patent Laid-Open Print No. 63-82860 which was published in 1988 without examination. In this wiper apparatus, a wiper arm with a wiper blade is set to be brought into reciprocal rotation between an upper reverse position and a lower reverse position.

Sometimes a slight error occurs in the installation of the wiper apparatus. In addition, due to long-range usage of the wiper apparatus, play between members is inevitably generated. In such cases, the upper reverse point and/or the lower reverse point gets out of order. This may result in the interference between the wiper blade and a pillar, and the occurrence of unwiped area in the windowshield.

However, when the foregoing problems are revealed, in order to cope with them, the wiper apparatus has to be re-installed, or a new wiper apparatus has to be prepared. Such installations are obviously cumbersome tasks.

SUMMARY OF THE INVENTION

It is, therefore, a principal object of the present invention to provide a wiper apparatus without the foregoing drawbacks.

In order to attain this object, a wiper apparatus is comprised of a housing secured to a vehicle body, a main shaft rotatably supported in the housing and secured with a wiper arm, a main lever fixedly connected to the main shaft so as to be rotatable therewith, a plate pivoted to the main lever, an arm pivoted to the plate, a joint mechanism connected to the arm, a motor connected via an intermediate mechanism to the joint mechanism for applying the reciprocating movement thereto, and adjusting means for changing the relative relationship between the arm and the main lever.

BRIEF DESCRIPTION OF THE DRAWINGS

Additional objects and advantages of the present invention will become more apparent from the following detailed description of preferred embodiment thereof when considered with reference to the attached drawings, in which:

FIG. 3 is a perspective view of a front side of a vehicle to which a wiper apparatus in FIG. 1 is provided;

DETAILED DESCRIPTION OF PREFERRED EMBODIMENT

Figure 1:
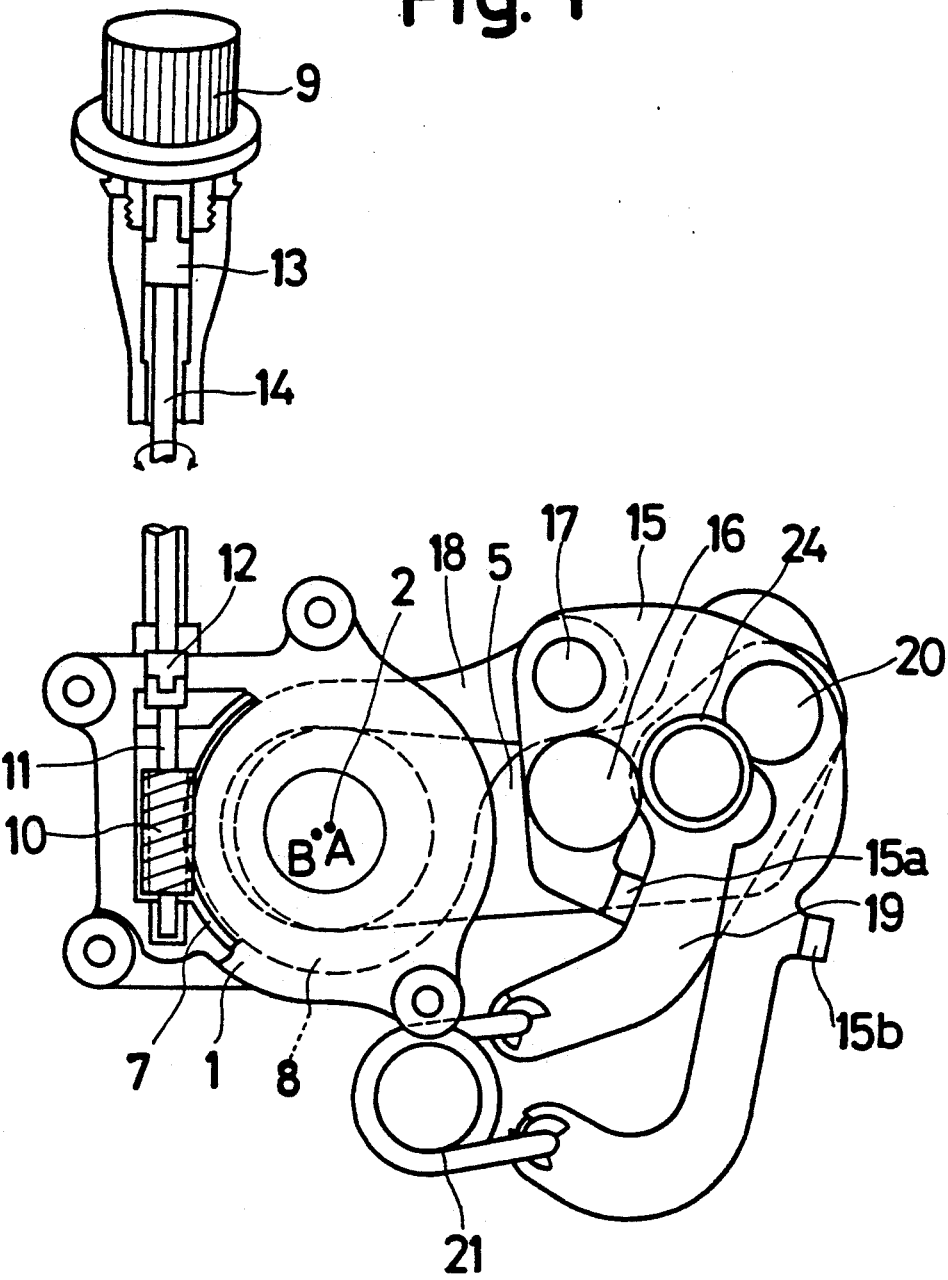
FIG. 1 is a plan view of a wiper apparatus in accordance with one embodiment of the present invention.
Figure 2:
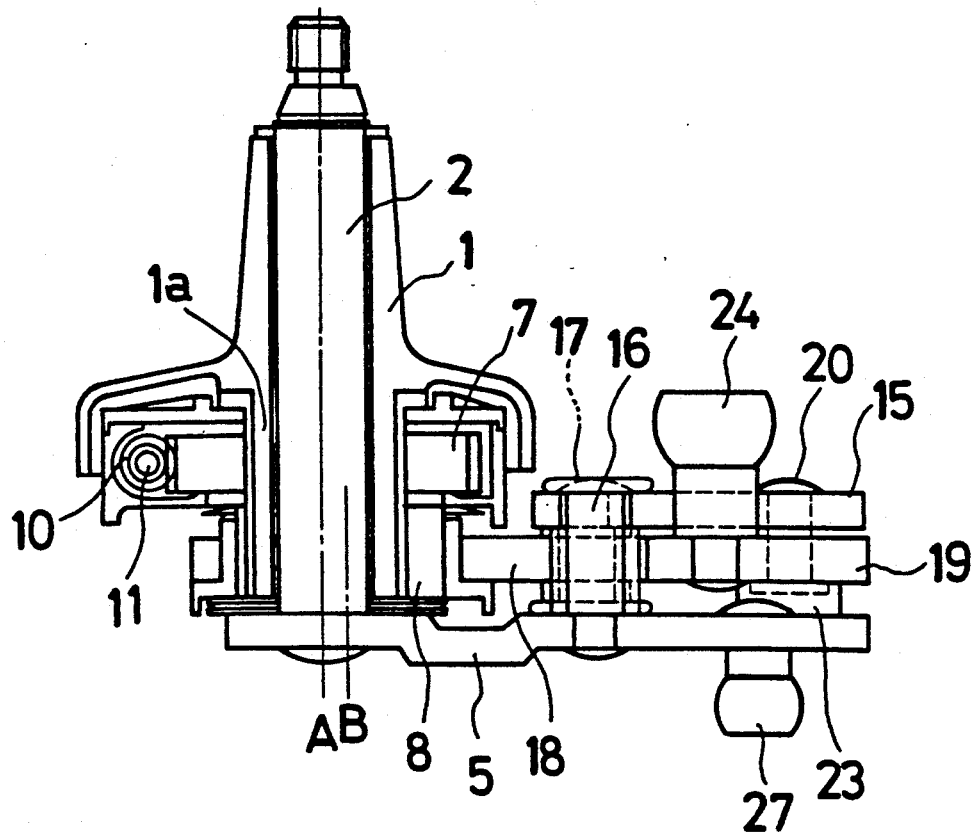
FIG. 2 is a vertical cross-sectional view of a wiper apparatus in FIG. 1.
Figure 4:
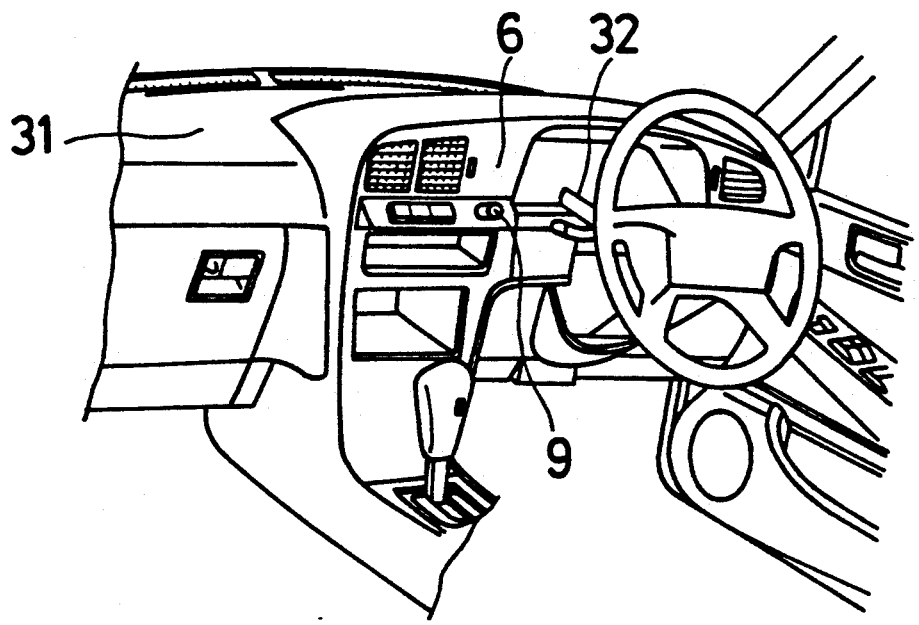
FIG. 4 is a perspective view of an inner space of a vehicle.
Figure 5:
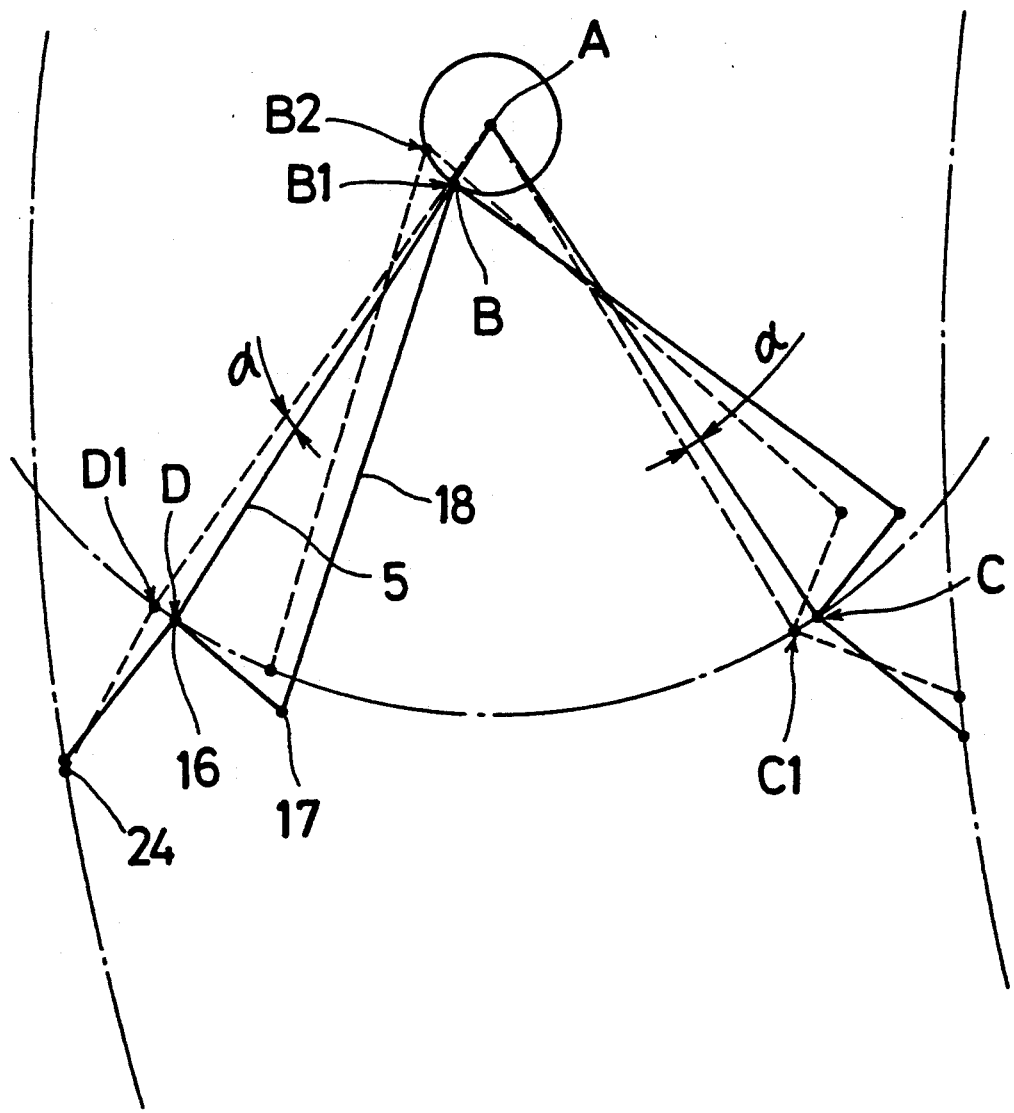
FIG. 5 is a view showing the operations of a main lever and a subordinate lever when an eccentric cam is rotated in one direction.
Figure 6:
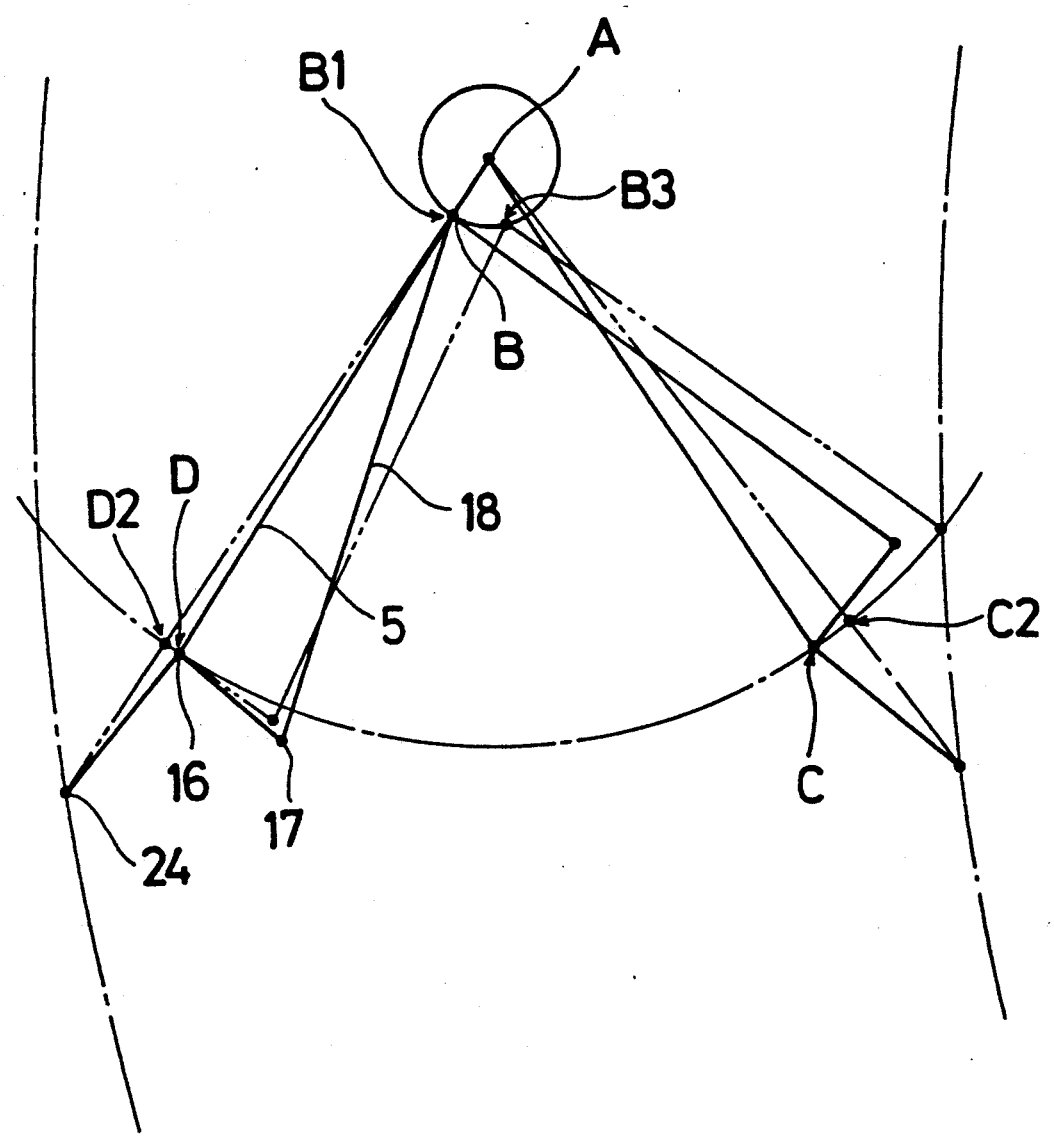
FIG. 6 is a view showing the operations of a main lever and a subordinate lever when an eccentric cam is rotated in the other direction.

Referring now to FIGS. 1 and 4, a wiper apparatus according to one embodiment of the present invention includes a housing 1, which is secured to a vehicle body 31, as is well-known. In the housing 1, a main shaft 2 is rotatably supported. A wiper arm 4 has a distal end to which is secured a wiper blade 4a for wiping a windowshield 3. The wiper arm 4 is secured to one end of the main shaft 2 so as to be rotatable with the wiper arm 4. A main lever 5 is secured to the other end of the main shaft 2 so as to be rotatable therewith. The housing 1 has a boss 1a in which the main shaft 2 is co-axially supported. A gear 7, which is co-axial with a central axis "A" about which the main shaft 2 rotates, is rotatably supported in the boss 1a. An eccentric cam 8 of an adjusting means, which has a central axis of rotation "B" offset from the rotational axis "A" of the main shaft 2, is formed integrally with the gear 7; and is rotatably supported on the boss 1a axially supporting the main shaft 2. Thus, the gear 7, the eccentric cam 8 and the main lever 5 are arranged, in the order as seen from the above, about the main shaft 2. Therefore, offsetting of the main shaft 2 is eliminated or deleted, thereby establishing more efficient transmission of a driving force from a wiper drive motor 26, and minituarization of a structure near the main shaft 2 as will be detailed below.

A plate 15 is pivotably supported on the main lever 5 by a pin 16. One end of subordinate lever 18 is pivotably supported on the plate 15 by a pin 17, and the other end of the lever is rotatably supported about the eccentric cam 8. An arm 19 is pivotably supported on the plate 15 by a pin 20. In turning from side to side, the arm 19 is brought into engagement with stoppers 15a and 15b formed on the plate 15. These stoppers thus limit the rotating range of the arm 19. A turnover spring 21 is disposed between the plate 15 and the arm 19; and has one end fastened to the arm 19 and its other end fastened to the plate 15. Two positions of the arm 19 are defined by the turnover spring 21. A block 23 is arranged between the main lever 5 and the arm 19, and is secured by a pin 20 in a male-female engagement. This is to prevent the main lever 5, the arm 19, and the plate 15 from developing play at the time of operation.

The arm 19 is secured with a joint mechanism 24, which is connected to the motor 26, via an intermediate mechanism including rod 25, which is well-known in structure and operation. Similarly, the main lever 15 is secured with a joint mechanism 27, and is connected to another main arm 29 via a rod 28.

The gear 7 is in meshing engagement with a worm 10, which is rotatably mounted on the housing 1 via shaft 11. The shaft 11 is connected to an adjusting knob 9, which is positioned on an instrument panel 6 in an inner space of the vehicle body 31 via connecting members 12 and 13, and a cable 14. The eccentric cam 8, the adjusting knob 9 and other members disposed therebetween constitute the adjusting member, which changes the relative relationship between the arm 19 and the main lever 5. As apparent from the following description, this change of the relationship brings the transfer of the upper reverse position or the lower reverse position.

The operation of the wiper apparatus will be explained hereinafter with reference to FIGS. 1, 3, 5 and 6.

Under the condition as shown in FIG. 3, an occupant (not shown) turns on a switch 32 for driving the motor 26. Rods 25 and 28 are pulled, thereby rotating main levers 5 and 29. The resulting rotation of each of main levers 5 and 29 is transmitted via the main shaft 2 to the wiper arm 4. Then, the wiper arm 4 is rotated about the axis "A" and is positioned at an upper reverse position "C". Thereafter, so long as the switch 31 is turned off, the wiper arm 4 is kept in reciprocal rotation between the upper reverse position "C" and a lower reverse position "D". This movement is shown in real lines in FIG. 5. During this movement of the wiper arm 4, the wiper blade 4a secured thereto continues to wipe the windowshield 3.

When the adjusting knob 9 is rotated in one direction, resulting rotation is transmitted via the connecting member 13, the cable 14, the connecting member 12 and the shaft 11 to the gear 7, thereby rotating the gear 7. This results in the rotation of the eccentric cam 8, which is integrally formed with the gear 7; and the central axis of "B" of the eccentric cam 8 is transferred from "B1" to "B2". Due to rotation of the eccentric cam 8, the subordinate lever 18 is pulled, thereby rotating the plate 15 and arm 19 about pin 16. However, since each position of the plate 15 and arm 19 is restricted due to the connection of the joint mechanism 24 and the rod 25, main lever 5 is rotated through an angle "α". Thus, the upper reverse position "C" and the lower reverse position "D" are adjusted to "C1" and "D1" respectively.

On the other hand, if the adjusting knob 9 is rotated in the other direction, the resulting rotation is transmitted via the connecting member 13, the cable 14, connecting member 12 and the shaft 11 to the worm 10, thereby establishing the rotation thereof, and the rotation of the gear 7. This results in the rotation of the eccentric cam 8 and subsequent transfer of the central axis "B" thereof from "B1" to "B3". Due to this rotation of the eccentric cam 8, the subordinate lever 18 is pulled, thereby rotating the plate 15 and arm 19 about the pin 16. However, since each position of the arm 19 and the plate 15 is restricted by the connection of the joint mechanism 24 and the rod 25, the main lever 5 is brought into rotation through an angle of "β". Thus, the upper reverse position "C" and the lower reverse position "D" are adjusted to "C2" and "D2" respectively.

As mentioned above, in this wiper apparatus, each upper reverse point and lower reverse point is adjustable, thereby having the following merit. If the upper (lower) reverse point is offset from the fixed or desired position in design, due to error in the rotating angle of the wiper arm 4, or the play between members generated by usage with age, the desired upper (lower) reverse point can be set by merely manipulating the knob 9, without re-assembling the apparatus. The interference between the wiper blade 4a and the pillar 30 can be easily prevented; and the elimination of the unwiped area by the wiper blade 4a can be also established.

Although certain specific embodiments of the present invention have been shown and described it is obvious that many modifications thereof are possible. The present invention, thereof, is not intended to be restricted to exact showing of the drawings and description thereof, but is considered to include reasonable and obvious equivalents.

What is claimed is:

1. A wiper apparatus for a vehicle windshield, comprising:
    a motor secured to a vehicle body;
    a motion imparting mechanism including a rod, said mechanism being fixed to said motor for imparting a reciprocating motion to the rod upon rotation of the motor;
    a housing secured to the vehicle body;
    a main shaft supported rotatably about a central axis in the housing;
    a wiper arm fixed to the main shaft, said wiper arm having a wiper blade for wiping a vehicle windshield upon back and forth rotation of the main shaft;
    a main lever fixed to the main shaft and rotatable therewith;
    a linkage including a plate and a pivot arm pivotably attached to one another;
    said plate of the linkage being pivotally attached to the main lever, said linkage including means yieldingly securing the plate and the pivot arm in at least one predetermined position relative to the main lever and to one another;
    means securing the arm of the linkage to said rod for rotating the wiper blade through a predetermined path of a vehicle windshield in accordance with a relative angular position between the pivot arm and the main lever;
    an eccentric cam rotatable about the main shaft and having an axis of rotation offset from the central axis of the main shaft;
    a subordinate lever having one end rotatably mounted on the eccentric cam and another end pivotally coupled to the plate; and
    adjusting means for rotating the eccentric cam through a selected angle to change the pivot position of the main lever relative to the pivot arm, by movement of the subordinate lever and thus change a limit position of the predetermined wiping path of the wiper blade.

2. A wiper apparatus as set forth in claim 1 wherein the adjusting means has a gear formed integrally with the eccentric cam, a worm meshed therewith, a second shaft on which the worm is fixedly mounted, a cable connected at one end thereof to the second shaft, and an adjusting knob connected to the other end of the cable.

3. A wiper apparatus as set forth in claim 2, wherein the adjusting knob is positioned on an instrument panel within the vehicle body.

4. The apparatus of claim 1 wherein the another end of the subordinate lever is pivotally attached directly to the plate of the linkage.

5. The apparatus of claim 1 wherein the plate, the pivot arm, and the main lever are pivotally mounted on axes parallel to one another.

6. The apparatus of claim 5 wherein the subordinate lever is disposed between the plate and the pivot arm.

7. The apparatus of claim 6 wherein the plate, subordinate lever, the pivot arm, and the main lever have surfaces disposed in parallel planes.

* * * * *